US006804699B1

(12) United States Patent
Henrie

(10) Patent No.: US 6,804,699 B1
(45) Date of Patent: Oct. 12, 2004

(54) IDENTIFYING AND LOCATING LOST OR STOLEN PERSONAL DIGITAL ASSISTANT DEVICES VIA A LANDLINE- OR WIRELESS-CONNECTED WEB SERVER

(75) Inventor: James B. Henrie, Grayslake, IL (US)

(73) Assignee: palmOne, Inc., Milpitas, CA (US)

( * ) Notice: Subject to any disclaimer, the term of this patent is extended or adjusted under 35 U.S.C. 154(b) by 569 days.

(21) Appl. No.: 09/618,406

(22) Filed: Jul. 18, 2000

(51) Int. Cl.[7] .............................................. G06F 15/16
(52) U.S. Cl. ........................ 709/203; 709/250; 709/225
(58) Field of Search ................................ 709/203, 225, 709/224, 250; 713/200, 201; 714/9; 455/410

(56) References Cited

U.S. PATENT DOCUMENTS

| | | | | |
|---|---|---|---|---|
| 5,757,271 A | * | 5/1998 | Andrews | 340/568.1 |
| 6,300,863 B1 | * | 10/2001 | Cotichini et al. | 340/5.8 |
| 6,333,684 B1 | * | 12/2001 | Kang | 340/7.2 |
| 6,362,736 B1 | * | 3/2002 | Gehlot | 340/568.1 |
| 6,542,729 B1 | * | 4/2003 | Chmaytelli et al. | 340/5.8 |

* cited by examiner

Primary Examiner—Zarni Maung
(74) Attorney, Agent, or Firm—Wagner, Murabito & Hao LLP

(57) ABSTRACT

A system and method for preventing unauthorized use of a device (e.g., a portable computer system) and for recovering the device when, for example, the device has been lost or stolen and an attempt to use it is made by someone other than an authorized user. The authorized user registers the device in a database at a central site (e.g., a Web site) using a unique identifier such as the device's serial number. If the device is lost or stolen, this information is entered into the Web site database by the authorized user. When the device is connected to the Internet using either a wireless or a landline connection, the device automatically communicates its unique identity to the Web site. The Web site performs a lookup and, if the database indicates that the device is lost or stolen, the device is so notified. In response, the device disables normal operation and instead will display, for example, the name and address of the authorized user. Other security measures can be used depending on the preferences of the authorized user; for example, the Web site can initiate a trace to locate the device. Thus, when a device is lost or stolen, it can be more readily recovered and, in the meantime, unauthorized use is prevented.

22 Claims, 14 Drawing Sheets

IDENTIFYING AND LOCATING LOST OR STOLEN PERSONAL DIGITAL ASSISTANT DEVICES VIA A LANDLINE- OR WIRELESS-CONNECTED WEB SERVER

BACKGROUND OF THE INVENTION

1. Field of the Invention

The present invention relates to the field of portable devices such as personal digital assistants or palmtop computer systems. Specifically, the present invention relates to a method and system for preventing unauthorized use of a portable device and for facilitating recovery of the portable device if it is lost or stolen.

2. Related Art

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

On the other hand, because they are relatively small, palmtop computer systems can be easily lost or stolen. Although they are not extremely expensive, palmtops are expensive enough to make them attractive to thieves. To the owner of a palmtop, not only is there a monetary loss if the device is lost or stolen, but the information stored on the palmtop may be very valuable and possibly irreplaceable. Consequently, it is desirable to discourage theft of palmtop computer systems and to encourage their return to their rightful owners when they are lost or stolen.

In addition, it is desirable to prevent use of the palmtop if it is not in the possession of an authorized user. Importantly, this may discourage deliberate acts such as theft if it is known beforehand that the palmtop can only be used by an authorized user. Of further importance, this can prevent information stored on the palmtop from being accessed by someone other than an authorized user.

In the prior art, one method for protecting against unauthorized use of a computer system or against unauthorized access to information stored in a computer system is to use a password. However, passwords are considered by many users to be vexing and inconvenient, passwords can lock out even an authorized user, and experience shows that passwords can be defeated by unauthorized users. In addition, while a password may prevent access to applications and information already existing on the palmtop, it will generally not prevent an unauthorized user from adding new applications and information. Thus, an unauthorized user can simply assume ownership of the palmtop and ignore the password-protected information.

SUMMARY OF THE INVENTION

Accordingly, what is needed is a system and/or method that can discourage theft of a device such as a palmtop computer system or personal digital assistant (PDA), and that can encourage return of the device to the rightful owner if it is lost or stolen. What is also needed is a system and/or method that can satisfy the above need and that can prevent use of the device and unauthorized access to information stored on the device if it is not in the possession of an authorized user. In addition, what is needed is a system and/or method that can satisfy the above needs and that is user-friendly and convenient. The present invention provides these advantages and others not specifically mentioned above but described in the sections to follow.

A method and system are described for preventing unauthorized use of a device (e.g., a palmtop computer system or PDA) and for facilitating recovery of the device when, for example, the device has been lost or stolen and an attempt to use it is made by someone other than an authorized user. The authorized user registers the device in a database at a central site using a unique identifier for the device. If the device is lost or stolen, the authorized user records this in the central site database. When the device is connected to the central site using either a wireless or a landline connection, the device automatically communicates its unique identity to the site. The central site performs a lookup based on the unique identity and, if the database indicates that the device is lost or stolen, the device is so notified. In response, the device automatically disables normal operation.

In another embodiment, instead of notifying the device that it is lost or stolen, the device is notified that it is not lost or stolen and its use is authorized. In this embodiment, operation of the device is automatically enabled when the central site indicates that use of the device is authorized. This feature can also be used to re-enable a device that was reported as lost or stolen and disabled as a result, and then was recovered by its authorized user.

In one embodiment, the central site is a World Wide Web site residing on a server computer system in a computer system network (e.g., the Internet).

In one embodiment, when disabled, the device displays information that can be used to identify and contact the authorized user, such as the user's name and address. In other embodiments, other security measures can be used depending on the preferences of the authorized user. In one of these embodiments, the Web site can initiate a trace to locate the device. In another embodiment, if the device does not make contact with the central site for a specified period of time, operation of the device is automatically disabled.

Thus, in accordance with the present invention, when a device is lost or stolen, it can be more readily recovered and, in the meantime, unauthorized use of the device is prevented. Each time the device is connected to the Internet, the device automatically checks a Web site to determine if it is lost or stolen. If the device is reported as lost or stolen, the device will be disabled to prevent normal operation. While in the disabled mode, the device can display information on how to contact the authorized user, or the Web site can initiate a trace to find the location of the device.

In accordance with the present embodiment of the present invention, these security measures can be automatically implemented in the background without a user knowing they are occurring, and thus they are convenient and user-friendly. In addition, once it is understood that unauthorized use will cause the device to be disabled and thus of little use to an unauthorized user, the likelihood of theft of the device is expected to decrease, and the likelihood of its return to the rightful owner is expected to increase.

DETAILED DESCRIPTION OF THE INVENTION

Figure 1A:
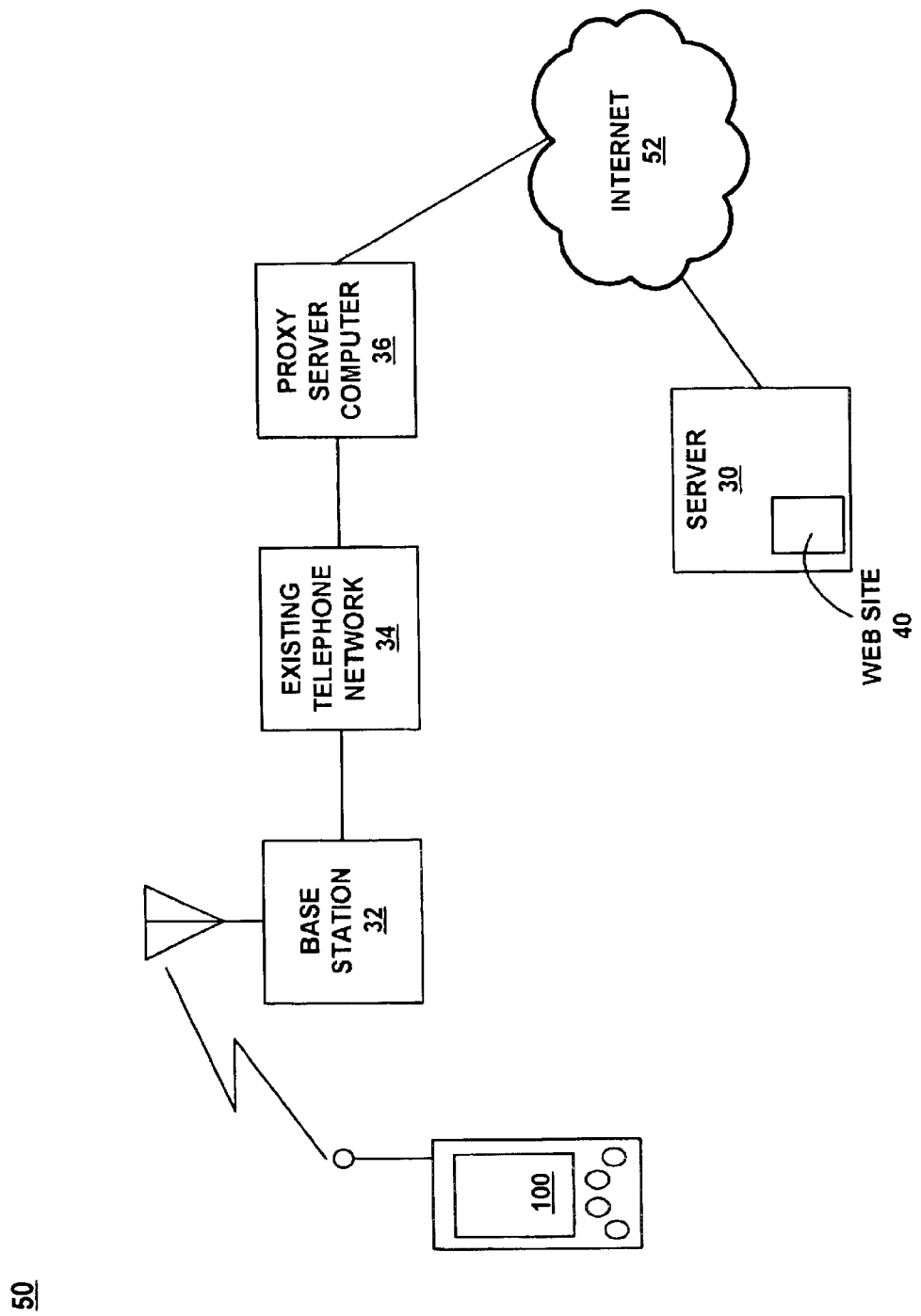
FIG. 1A is a block diagram of an exemplary network environment including a portable computer system in accordance with one embodiment of the present invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "indicating" or "indexing" or "receiving" or "performing" or "initiating" or "sending" or "implementing" or "disabling" or "enabling" or "displaying" or the like, refer to the action and processes of a computer system (e.g., process 900 of FIG. 9), or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a portable computer system, such as a palmtop or personal digital assistant, with the capability to access via the Internet a World Wide Web ("Web") site residing on a server computer system. However, it is appreciated that the present invention can be used with other types of devices that have the capability to access some type of central device or central site, including but not limited to laptop computer systems.

Exemplary Palmtop Platform

FIG. 1A is a block diagram of an exemplary network environment 50 including a portable computer system 100 in accordance with one embodiment of the present invention. Portable computer system 100 is also known as a palmtop or palm-sized computer system or as a personal digital assistant (PDA). In one embodiment, portable computer system 100 has the ability to transmit and receive data and information over a wireless communication interface (e.g., a radio interface). In one embodiment, the wireless communication interface is integrated into portable computer system 100; in another embodiment, the wireless communication interface is accomplished with a wireless modem attachment (not shown).

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52.

Coupled with Internet 52 are multiple servers exemplified by server 30. Residing on server 30 is a Web site 40. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

FIGS. 1B, 1C, 1D, 1E and 1F are block diagrams showing various embodiments of a system 51 for coupling a portable computer system 100 to other computer systems and to the Internet 52 in accordance with the present invention. System 51 is described in the context of wired connections between its various devices and components; however, it is appreciated that wireless connections (such as but not limited to Bluetooth wireless connections) can also be used.

Figure 1B:
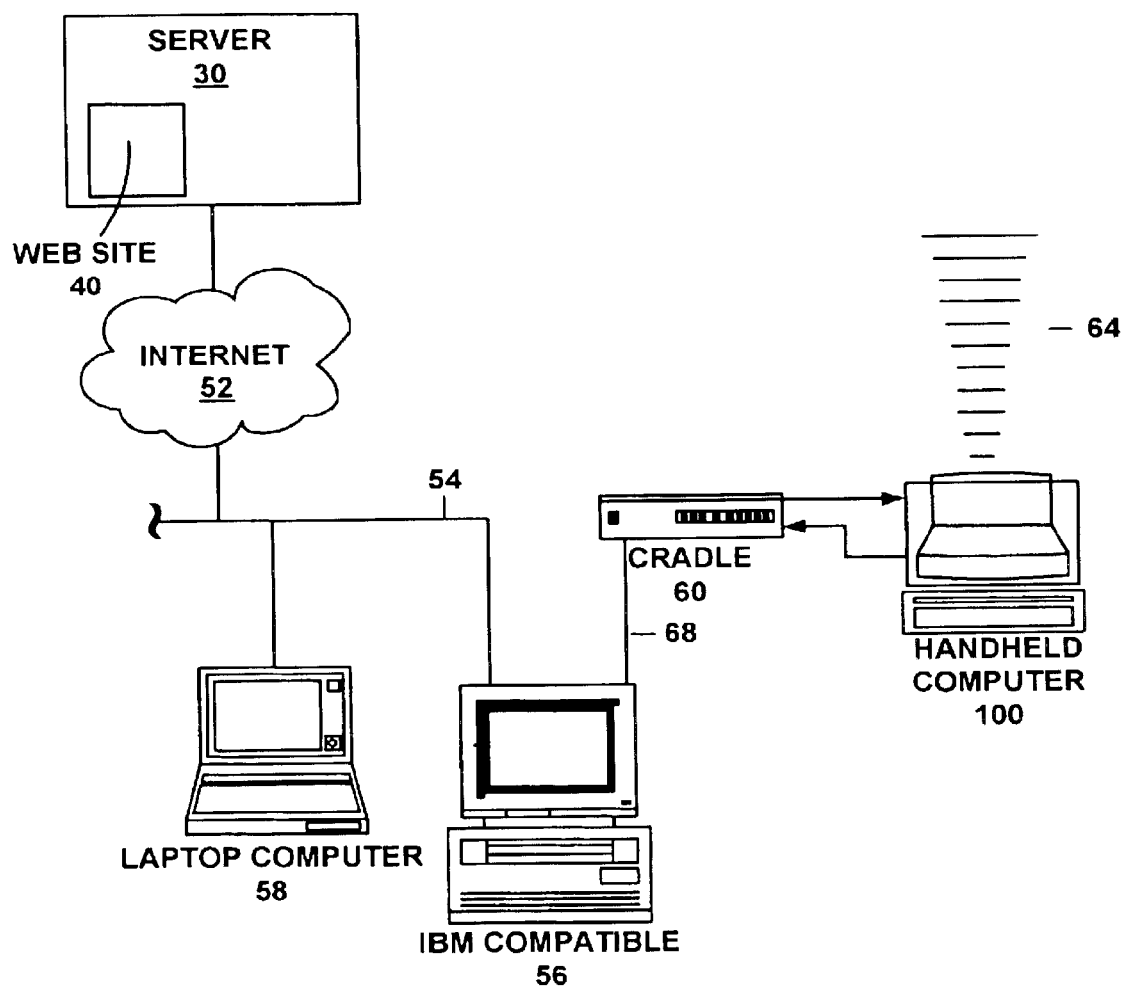
FIGS. 1B, 1C, 1D, 1E and 1F are block diagrams showing various embodiments for coupling a portable computer system to other computer systems and to the Internet in accordance with the present invention.

With reference first to FIG. 1B, system 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54 such as an Ethernet Local Area Network (LAN), but which can instead be any of a number of other types. Bus 54 can provide communication with the Internet 52 using a number of well-known protocols. Coupled with Internet 52 are multiple servers exemplified by server 30. Residing on server 30 is a Web site 40.

Importantly, in the present embodiment, host computer system 56 is also coupled via connector cable 68 to a cradle 60 for receiving and initiating communication with portable computer system 100 ("handheld computer") of the present invention. Connector cable 68 can be a serial bus (e.g., RS232), a parallel bus, a Universal Serial Bus (USB), or any other type of workable connection. Cradle 60 provides an electrical and mechanical communication interface between connector cable 68 and portable computer system 100 for two-way communications with host computer system 56. Portable computer system 100 also contains a wireless infrared communication mechanism 64 for sending and receiving information from other devices.

Figure 1C:
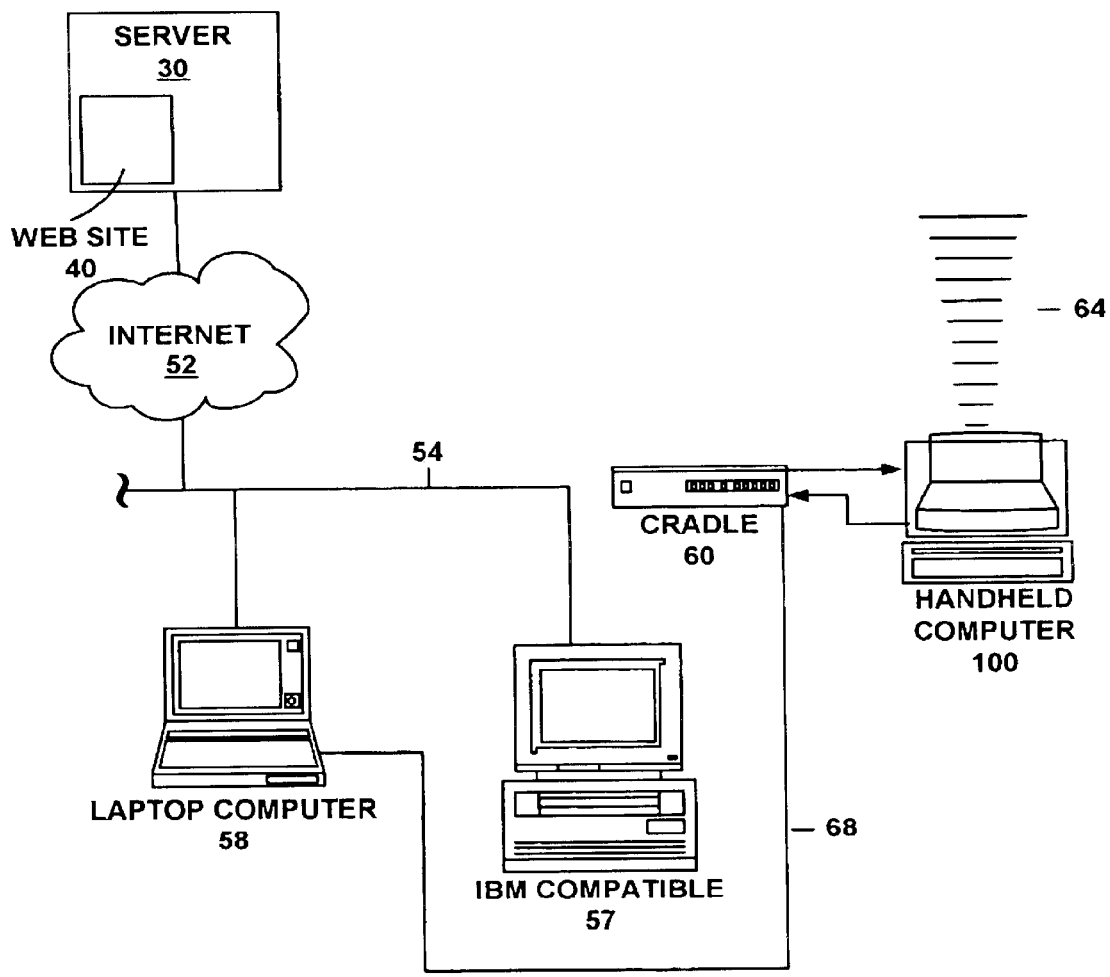

With reference next to FIG. 1C, in this embodiment, laptop system 58 is coupled via connector cable 68 to cradle 60. As described above, connector cable 68 can be a serial bus (e.g., RS232), a parallel bus, a USB, or any other type of workable connection for enabling two-way communication between portable computer system 100 and laptop system 58.

Figure 1D:
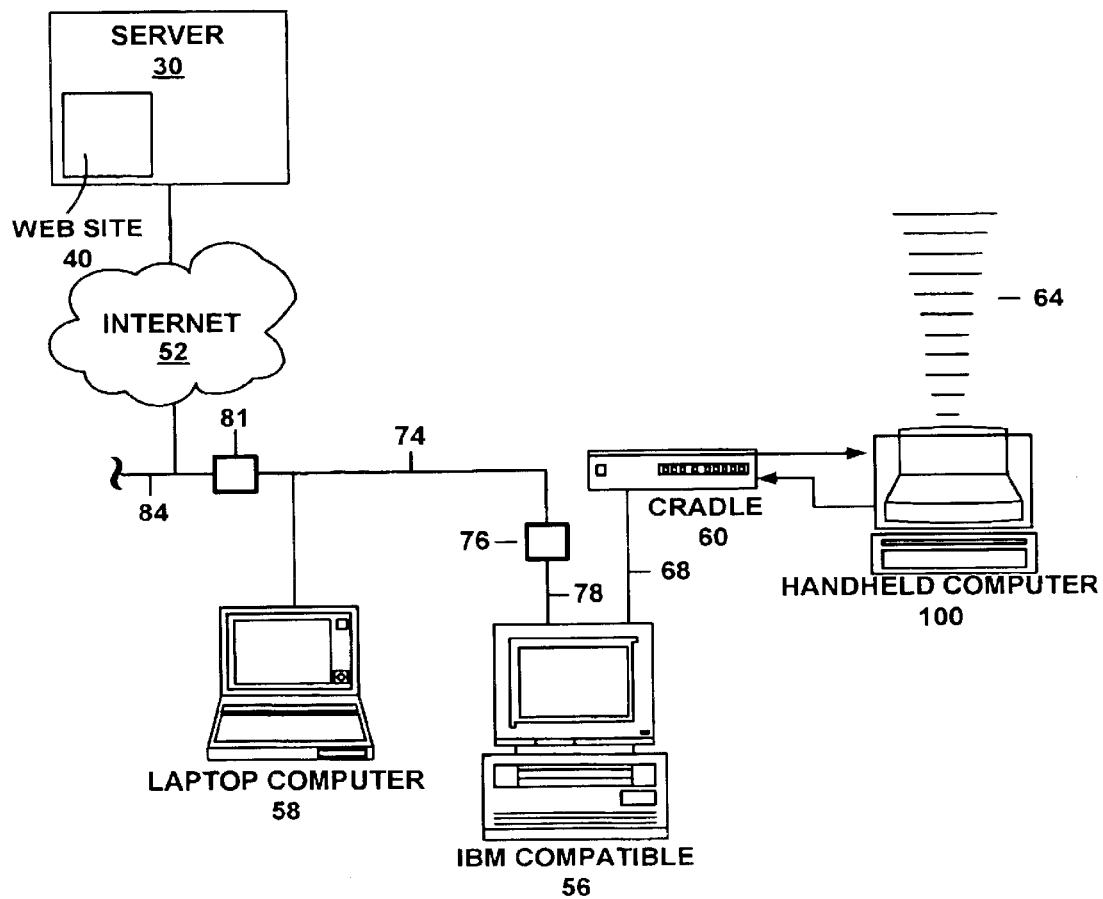

FIG. 1D shows another embodiment of system 51 in accordance with the present invention. In this embodiment, host computer system 56 is coupled via connector cable 68 to cradle 60. Host computer system 56 is also coupled to a modem 76 via another connector cable 78. Connector cable 78 can be a serial bus, a parallel bus, a USB, or any other type of workable connection that can be used for allowing two-way communication between host computer system 56 and the Internet 52. In this embodiment, connector cable 78 is coupled with a wire line 74 to a central office (or cable office, etc.) 81 via modem 76. Modem 76 can be internal to or external to host computer system 56. Modem 76 can be an analog modem, a cable modem, an ADSL (Asymmetric Digital Subscriber Line) modem, or any other such device. Central office 81 in turn is communicatively coupled to the Internet 52 via some type of well-known communication line 84.

Figure 1E:
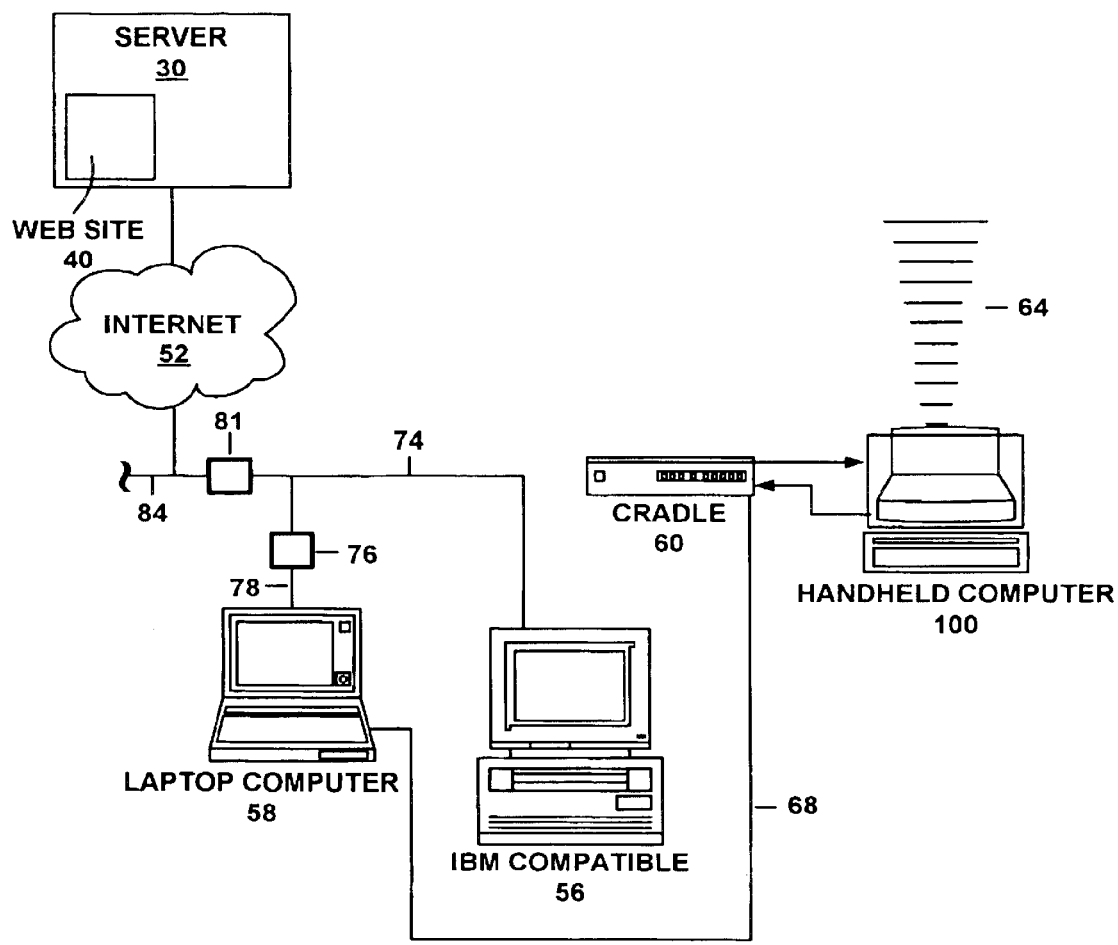

FIG. 1E shows another embodiment of system 51 in accordance with the present invention. In this embodiment, laptop system 58 is coupled via connector cable 68 to cradle 60. Laptop system 58 is also coupled to modem 76 via connector cable 78. In this embodiment, connector cable 78 is coupled with wire line 74 to central office 81 via modem 76. Central office 81 in turn is communicatively coupled to the Internet 52 via communication line 84.

Figure 1F:
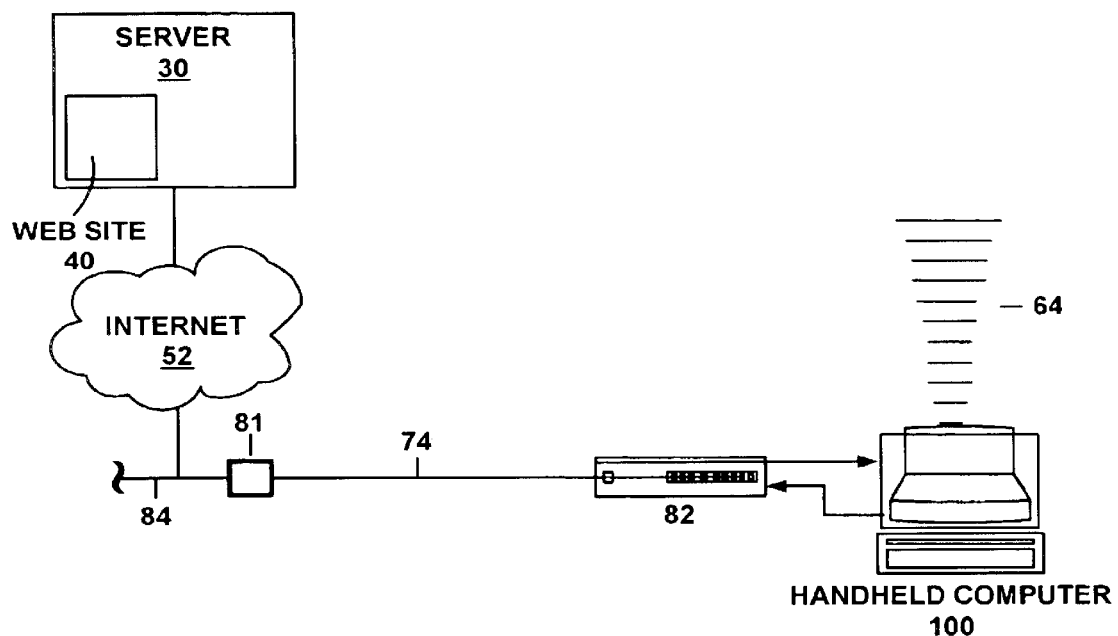

FIG. 1F shows another embodiment of system 51 in accordance with the present invention. In this embodiment, portable computer system 100 is coupled with wire line 74 via a modem 82. In one embodiment, portable computer system 100 is a Palm V or other such PDA, and modem 82 is a Palm V modem or PDA modem. Wire line 74 is communicatively coupled to central office 81 which in turn is communicatively coupled to the Internet 52 via communication line 84.

With reference to FIGS. 1A through 1F, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Figure 2:
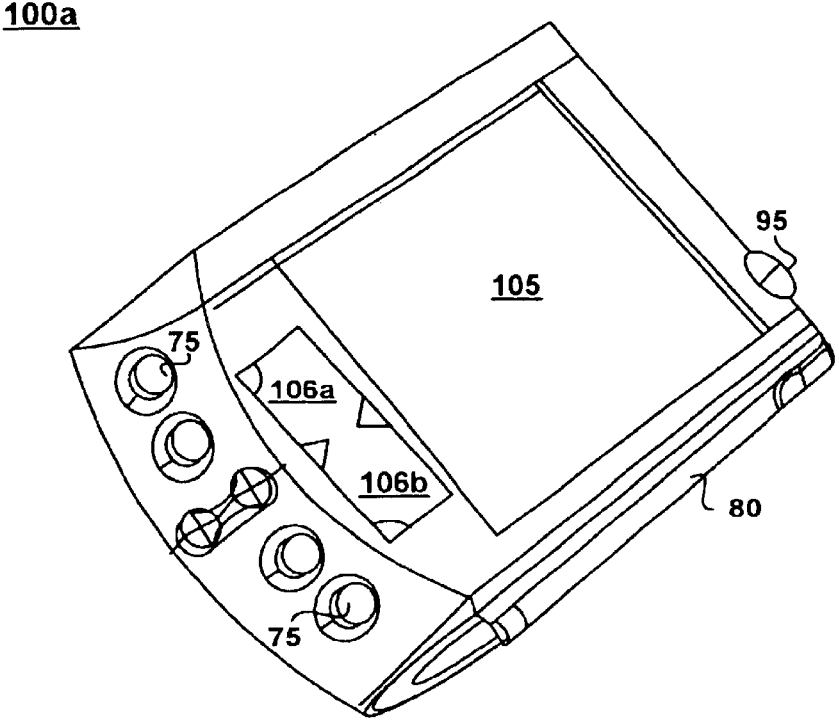
FIG. 2 is a top side perspective view of a portable computer system in accordance with one embodiment of the present invention.

FIG. 2 is a perspective illustration of the top face 100a of one embodiment of the palmtop computer system 100 of the present invention. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
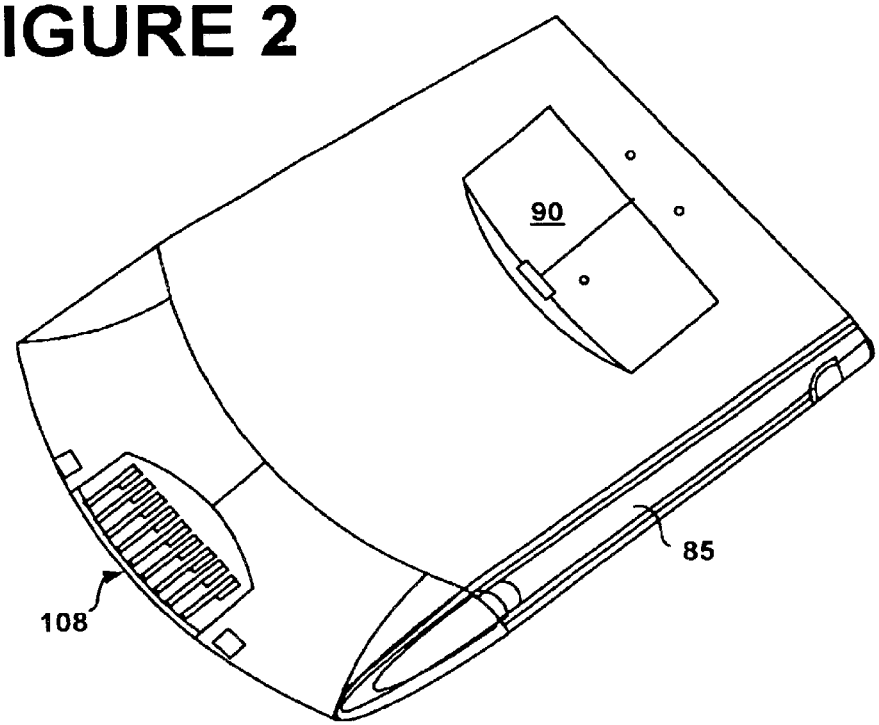
FIG. 3 is a bottom side perspective view of the portable computer system of FIG. 2.

FIG. 3 illustrates the bottom side 100b of one embodiment of the palmtop computer system that can be used in accordance with various embodiments of the present invention. An extendible antenna 85 is shown, and also a battery storage compartment door 90 is shown. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

Figure 4:
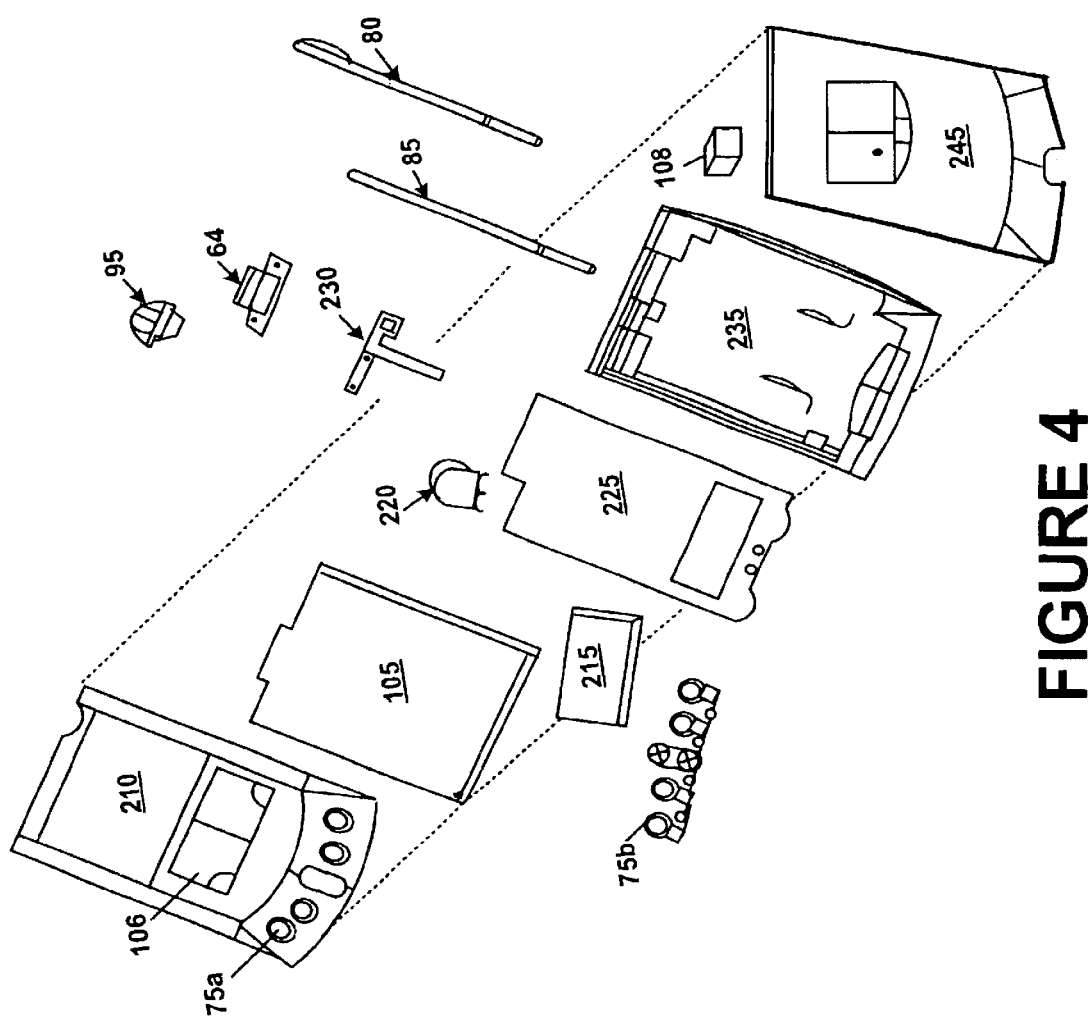
FIG. 4 is an exploded view of the components of the portable computer system of FIG. 2.

FIG. 4 is an exploded view of the palmtop computer system 100 in accordance with one implementation. Computer system 100 contains a back cover 245, and a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 1B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between computer system 100 and other networked computers and/or the Internet via a proxy server (see FIG. 1A).

Figure 5:
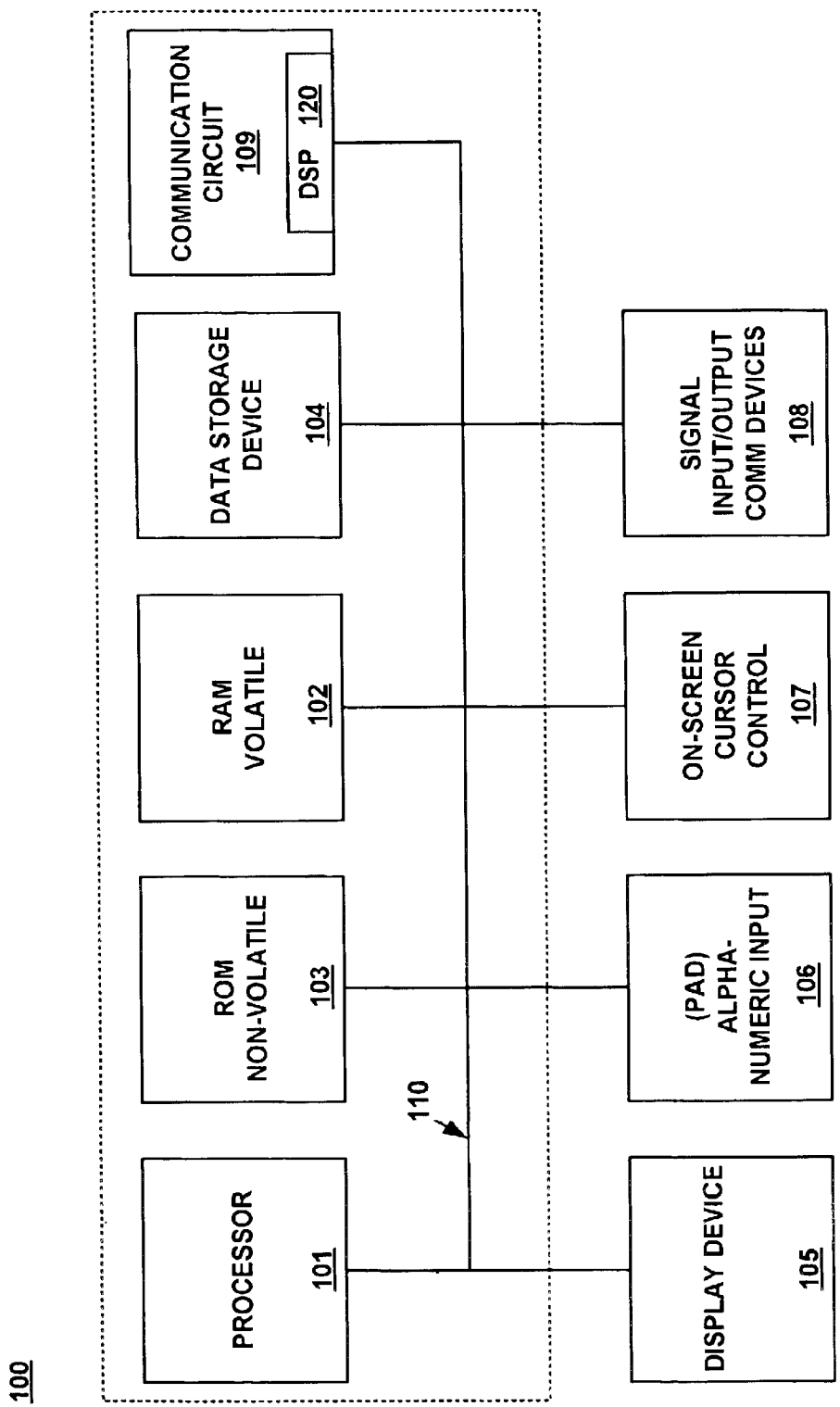
FIG. 5 is a block diagram of one embodiment of a portable computer system in accordance with the present invention.

FIG. 5 illustrates circuitry of computer system 100, some of which can be implemented on PC board 225 (FIG. 4). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user. PC board 225 can contain the processor 101, the bus 110, the ROM 103 and the RAM 102.

With reference still to FIG. 5, computer system 100 also includes a signal transmitter/receiver device 108, which is coupled to bus 110 for providing a physical communication link between computer system 100, and a network environment (e.g., network environments 50 and 51 of FIGS. 1A through 1F). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 5 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 6:
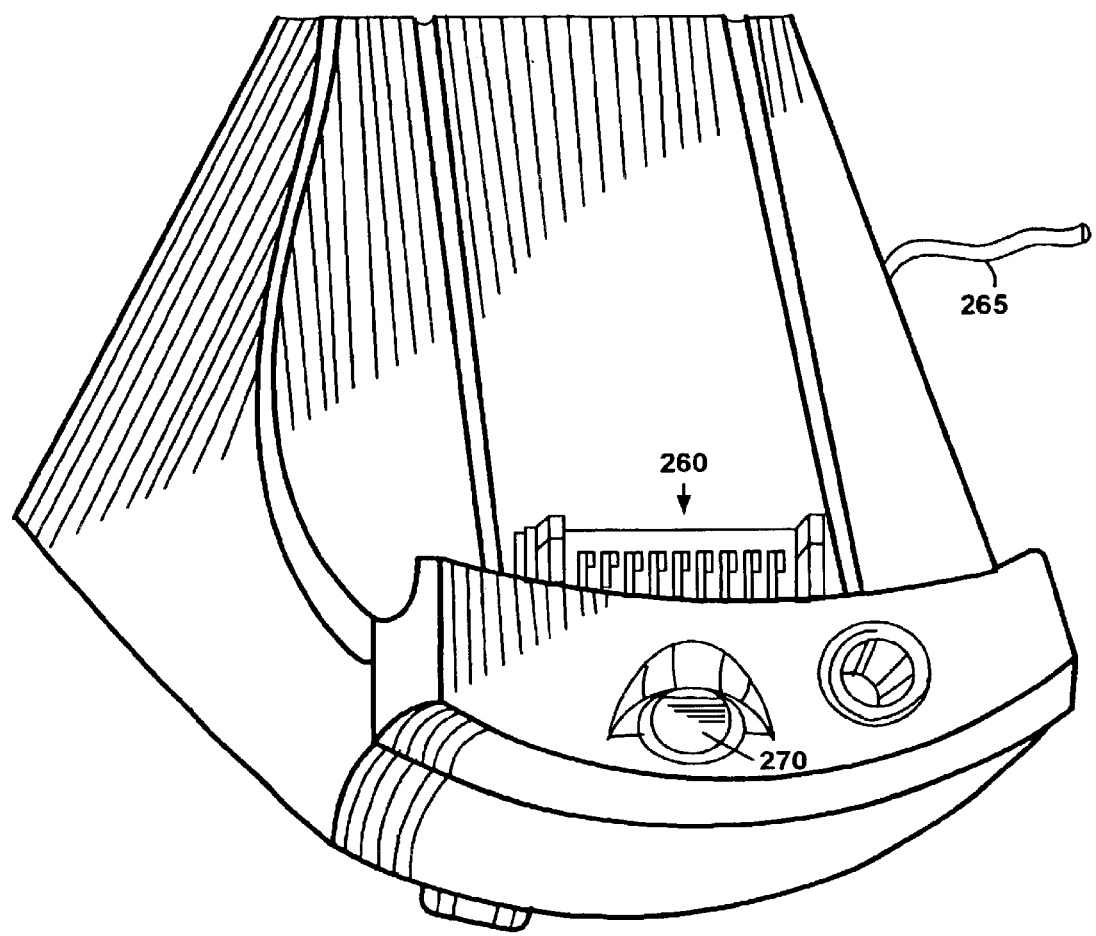
FIG. 6 is a perspective view of the cradle device for connecting the portable computer system to other systems via a communication interface in accordance with one embodiment of the present invention.

FIG. 6 is a perspective illustration of one embodiment of the cradle 60 for receiving the palmtop computer system 100. Cradle 60 contains a mechanical and electrical interface 260 for interfacing with communication interface 108 (FIG. 3) of computer system 100 when system 100 is slid into the cradle 60 in an upright position. Once inserted, button 270 can be pressed to initiate two-way communication (e.g., a communication session) between computer system 100 and other computer systems coupled to serial communication 265.

Exemplary Desktop/Laptop/Server Platform

Figure 7:
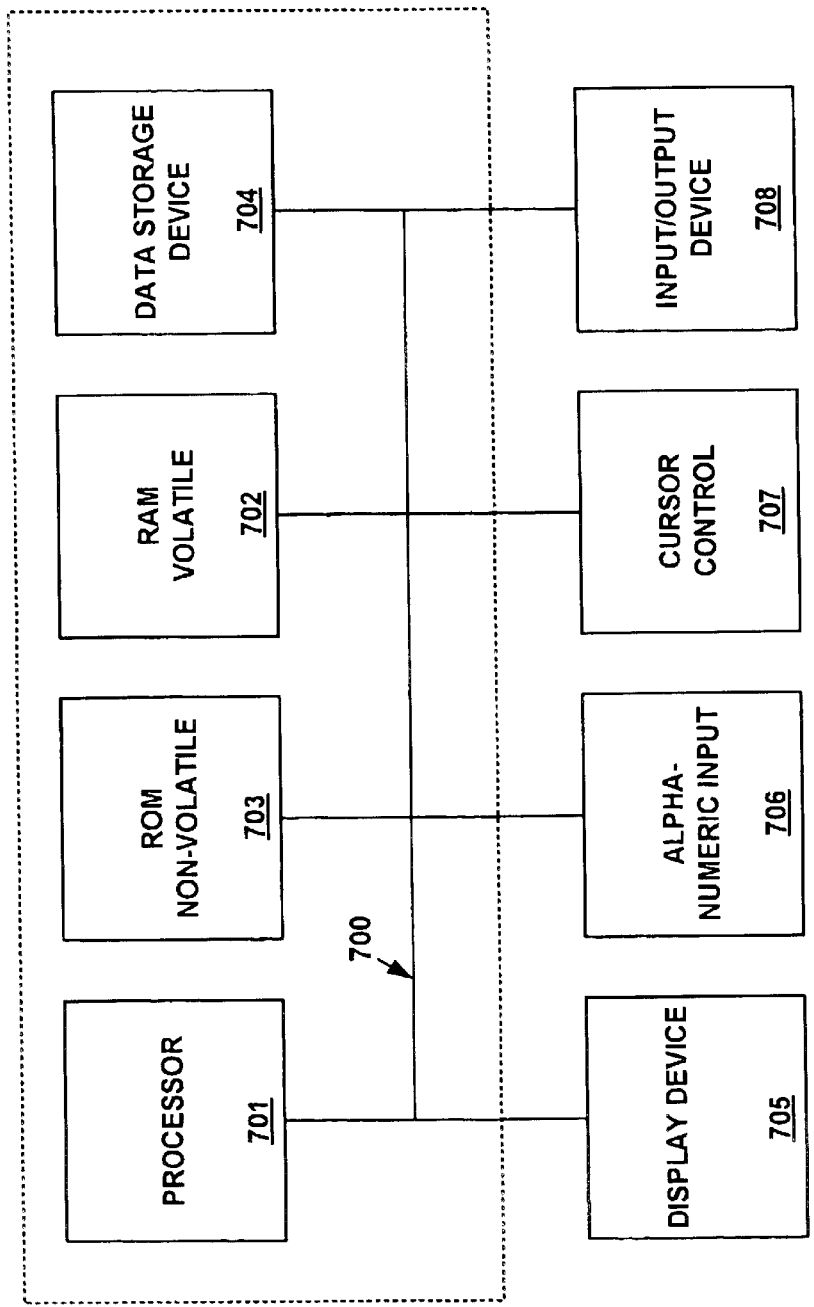
FIG. 7 is a block diagram of one embodiment of a server, desktop or laptop computer system in accordance with the present invention.

Refer now to FIG. 7 which illustrates an exemplary computer system 342 with which embodiments of the present invention may be practiced. Computer system 342 exemplifies desktop computer system 56 or laptop computer system 58 of FIG. 1B. Computer system 342 also exemplifies a server computer system in a computer system network (such as server 30 in FIGS. 1A through 1F) or a proxy server computer (e.g., proxy server 36 of FIG. 1A).

Continuing with reference to FIG. 7, in general, computer system 342 comprises bus 700 for communicating information, processor 701 coupled with bus 700 for processing information and instructions, random access (volatile) memory (RAM) 702 coupled with bus 700 for storing information and instructions for processor 701, read-only (non-volatile) memory (ROM) 703 coupled with bus 700 for storing static information and instructions for processor 701, data storage device 704 such as a magnetic or optical disk and disk drive coupled with bus 700 for storing information and instructions, an optional user output device such as display device 705 coupled to bus 700 for displaying information to the computer user, an optional user input device such as alphanumeric input device 706 including alphanumeric and function keys coupled to bus 700 for communicating information and command selections to processor 701, and an optional user input device such as cursor control device 707 coupled to bus 100 for communicating user input information and command selections to processor 701. Furthermore, an optional input/output (I/O) device 708 is used to couple computer system 342 to, for example, a communication bus (e.g., communication bus 54 of FIG. 1B).

Continuing with reference to FIG. 7, display device 705 utilized with computer system 342 may be a liquid crystal device, cathode ray tube, or other display device suitable for creating graphic images and alphanumeric characters recognizable to the user. Cursor control device 707 allows the computer user to dynamically signal the two-dimensional movement of a visible symbol (pointer) on a display screen of display device 705. Many implementations of the cursor control device are known in the art including a trackball, mouse, joystick or special keys on alphanumeric input device 706 capable of signaling movement of a given direction or manner of displacement. It is to be appreciated that the cursor control 707 also may be directed and/or activated via input from the keyboard using special keys and key sequence commands. Alternatively, the cursor may be directed and/or activated via input from a number of specially adapted cursor directing devices.

Figure 8:
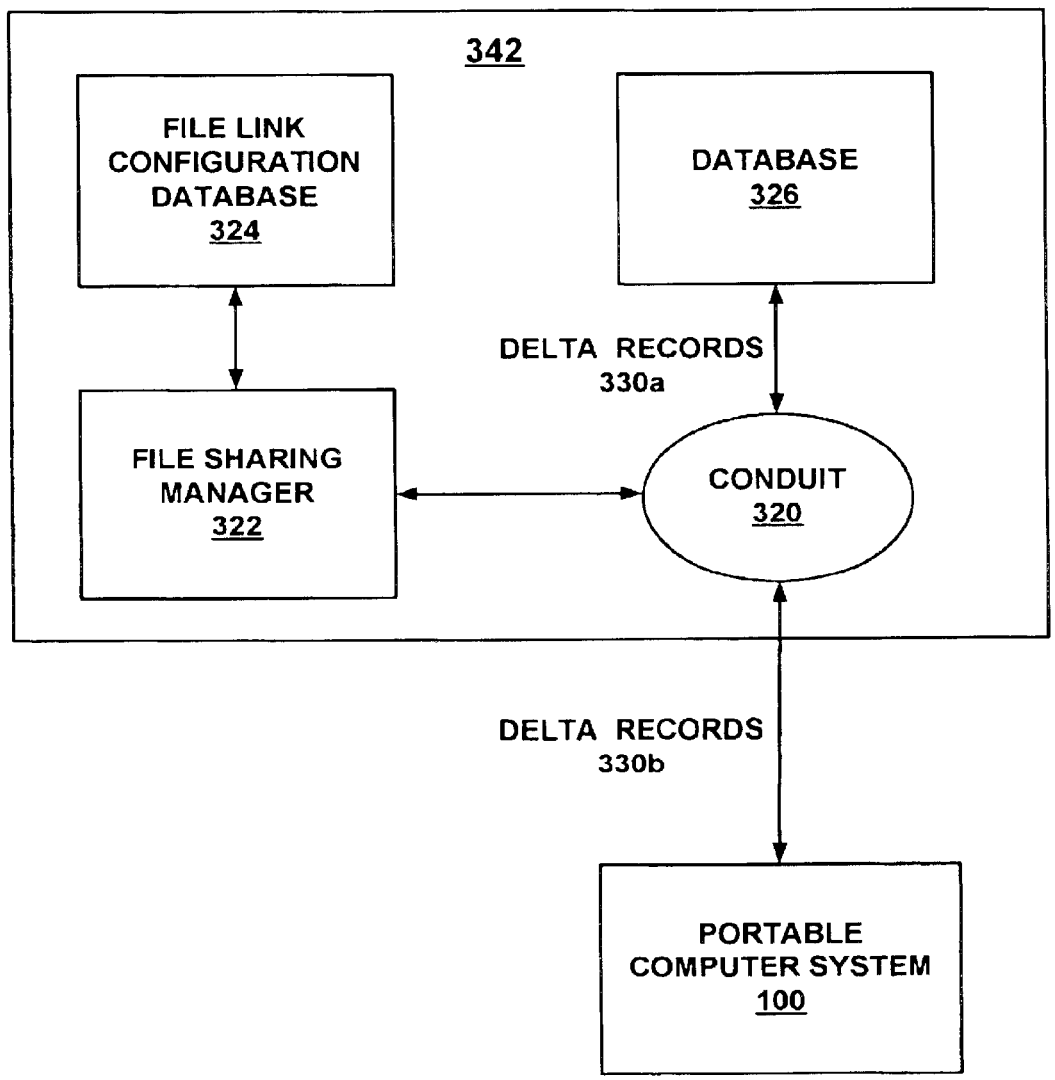
FIG. 8 is a block diagram of a one embodiment of a system for allowing a portable computer system and another computer system to share information in accordance with the present invention.

FIG. 8 illustrates a system 340 (also referred to as an "installer") in accordance with one embodiment of the present invention for allowing a portable computer system 100 (e.g., a palmtop or any portable computer system) to share information with another computer, e.g., a host computer system (e.g., desktop computer system 56 or laptop computer system 58 of FIG. 1B). System 340 contains database 326, a software file sharing manager 322 (e.g., a hot-sync software manager), a file link configuration database 324, and a software conduit 320. The file link configuration database 324 is linked to the file sharing manager 322 and specifies, for a particular database, its source file, category information, and the frequency of update for the database. Conduit 320 outlines the manner in which records are to be synchronized between databases under control of file sharing manager 322. This process, including the file sharing manager and the conduit, is described in U.S. Pat. No. 5,884,323 by Hawkins et al., issued Mar. 16, 1999, assigned to the assignee of the present invention and hereby incorporated by reference.

With reference still to FIG. 8, portable computer system 100 is interfaced with system 340 using cradle 60 (FIG. 1B). Alternatively, portable computer system 100 can be interfaced with system 340 using a wireless (e.g., radio) connection. During synchronization between portable computer system 100 and database 326, delta records 330a and 330b are passed through conduit 320 between database 326 and a database of portable computer system 100 under control of the file sharing manager 322. Delta records 330a and 330b represent changes (including additions) that occurred on either portable computer system 100 or system 340. After synchronization, these two databases will contain the same information. Namely, records updated on portable computer system 100 are reflected in database 326 and vice versa. The synchronization process (including the file sharing manager) is described in U.S. Pat. No. 6,006,274 by Hawkins et al., issued Dec. 21, 1999, assigned to the assignee of the present invention and hereby incorporated by reference. Synchronization is also described in U.S. Pat. No. 5,727,202 by Kucala, issued Mar. 10, 1998, assigned to the assignee of the present invention and hereby incorporated by reference, and also in U.S. Pat. No. 5,832,489 by Kucala, issued Nov. 3, 1998, assigned to the assignee of the present invention and hereby incorporated by reference.

Figure 9:
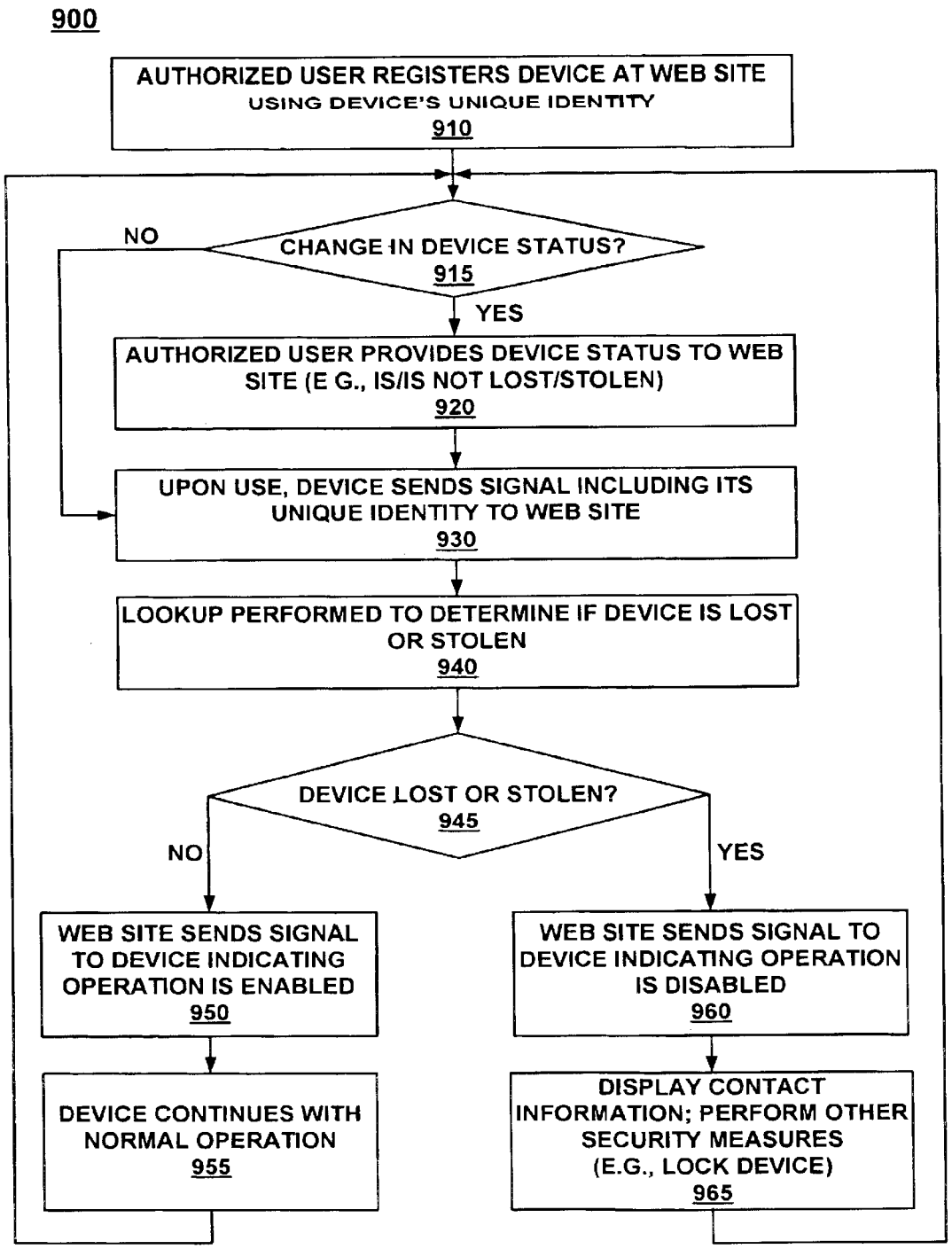
FIG. 9 is a flowchart showing the steps in a process for preventing unauthorized use of a portable device and for facilitating recovery of a portable device in accordance with one embodiment of the present invention.

Identifying and Locating Lost or Stolen Personal Digital Assistant Devices Viava Landline- or Wireless-connected Web Server FIG. 9 is a flowchart showing the steps in a process 900 for preventing unauthorized use of a portable device (e.g., portable computer system 100 of FIGS. 1A through 1F) and for facilitating recovery of the portable device in accordance with one embodiment of the present invention.

In step 910 of FIG. 9, in the present embodiment, the owner or an authorized user registers portable computer system 100 at a Web site on the Internet (e.g., Web site 40 on Internet 52 of FIGS. 1A through 1F). Web site 40 typically resides on a server computer system (e.g., a "central device") as exemplified by server 30 of FIGS. 1A through 1F.

With reference still to FIG. 9, portable computer system 100 can be registered in any number of ways using any Web site supporting the features of the present invention. In one embodiment, at about the time that portable computer system 100 is first acquired by the authorized user, the user can log onto Web site 40 and set up an account for portable computer system 100. The account can be password-protected. The user logs onto the account using the password and enters a unique identifier for portable computer system 100, such as the device's serial number.

In the present embodiment, the account is indexed using the unique identifier so that the account can be readily accessed using the unique identifier. The user can then enter preferences into the account pertaining to the security features of the present invention. For example, the security features can be enabled or disabled depending on user preferences.

In one embodiment, the user accesses Web site 40 to set up the account using portable computer system 100. For example, portable computer system 100 can be registered using the synchronization process described in conjunction with FIG. 8. In another embodiment, the user accesses Web site 40 using another device such as a personal computer. Web site 40 could also be configured to set up an account and receive information from the user via an automated telephone answering service.

In the present embodiment, Web site 40 is set up to support the features of the present invention. In one embodiment, in which portable computer system 100 is a palmtop computer such as a Palm III, a Palm V, or a Palm VII (or other such devices), Web site 40 can be a site such as Palm.net. In another embodiment, Web site 40 can be an Internet access conduit that is commonly available to users of portable devices, such as the AvantGo site. It is appreciated that the security features of the present invention will be desirable to users of portable devices, and as such a number of Web sites may find it advantageous to add such security features to the services they provide.

In step 915 of FIG. 9, if there is a change in device status, then the user reports this to Web site 40 (step 920). For example, if portable computer system 100 is lost or stolen, the user reports this to Web site 40. Similarly, if the user has previously reported the device as lost or stolen, and it has since been recovered, the user can report this to Web site 40. The user can report the loss or recovery to Web site 40 using a variety of methods, as described above.

In one embodiment, when the device is lost or stolen, the user accesses the account set up for portable computer system 100 at Web site 40 and enables the security features of the present invention by clicking on an input box to indicate that portable computer system 100 is lost or stolen. When the device is recovered, the user accesses the account at Web site 40 and disables the security features of the present invention by clicking on the input box, thereby indicating that portable computer system 100 is no longer lost or stolen.

In step 930 of FIG. 9, when portable computer system 100 is connected to Internet 52 (FIGS. 1A through 1F), it automatically connects to Web site 40. In the present embodiment, portable computer system 100 sends a signal to Web site 40 containing its unique: identity (e.g., its serial number), thereby identifying itself to Web site 40. In one embodiment, this connection is made in the background so that the user is not aware of the connection. As described above in conjunction with FIGS. 1A through 1F, the connection to Web site 40 can be via a wireless connection (including a wireless modem attachment) or via a landline (wired) connection. In one embodiment, the connection to Web site 40 can be accomplished during the synchronization process described in conjunction with FIG. 8.

In step 940 of FIG. 9, in the present embodiment, a lookup is performed based on the unique identity received in step 930. That is, using the unique identity, the account information for portable computer system 100 is accessed at Web site 40. The lookup is performed to determine if the device is or is not lost or stolen, based on the user input (account information) provided in step 920 above.

In step 945, based on the account information, a determination is made with regard to whether or not portable computer system 100 is lost or stolen (based on the user input provided in step 920). If portable computer system 100 is not reported as lost or stolen, then Web site 40 sends a signal to the device indicating normal operation of the device is enabled (step 950), and normal operation of the device continues (step 955). It is understood that enabling normal operation can be a default setting such that, if no response is received to the signal of step 930, then portable computer system 100 will continue to operate normally.

Alternatively, Web site 40 can respond to portable computer system 100 with an indication that the device is not lost or stolen, where this indication is necessary in order for portable computer system 100 to operate normally. In one embodiment, the user can configure portable computer system 100 such that it is necessary for the device to make contact with Web site 40 on a periodic basis, at an interval specified according to user preferences. If the specified time period expires before portable computer system 100 connects with Web site 40, then the device is automatically disabled. For example, the authorized user could specify that portable computer system 100 is to connect with Web site 40 once per week, and if a week goes by without such a connection, then portable computer system 100 is disabled. If, at a later time, the authorized user attempts to use portable computer system 100, then portable computer system 100 can still be connected to Web site 40 (this capability remains even if the device is in the disabled or locked mode). After looking up the account information based on the unique identity of portable computer system 100 (step 945) to determine whether the device has been lost or stolen, Web site 40 sends a signal to the device that unlocks the device and enables normal operation. It is appreciated that other actions may need to be performed in order to re-enable operation of the device.

In step 960, if portable computer system 100 is reported as lost or stolen, then Web site 40 sends a signal to the device indicating that normal operation of the device is disabled. As described above, disabling operability of the device can be the result of a signal received from Web site 40 or it can be a default setting if no response is received to the signal of step 930. In addition, if portable computer system 100 has been reported as lost or stolen and has already been disabled in accordance with the present invention, it will continue to remain disabled as a result of this step. For example, if portable computer system 100 is in the locked mode, and no response is received in step 960, then it will continue to remain in the locked mode.

In step 965, in the disabled mode of operation (e.g. a locked mode), many (almost all) functions of portable computer system 100 cannot be used. In one embodiment, portable computer system 100 changes the configuration stored in flash memory (e.g., ROM 103 of FIG. 5) from normal operation to the disabled mode to prevent unauthorized use. By storing the configuration information for the locked mode in flash memory, portable computer system 100 will remain locked even if its batteries are removed.

Figure 10:
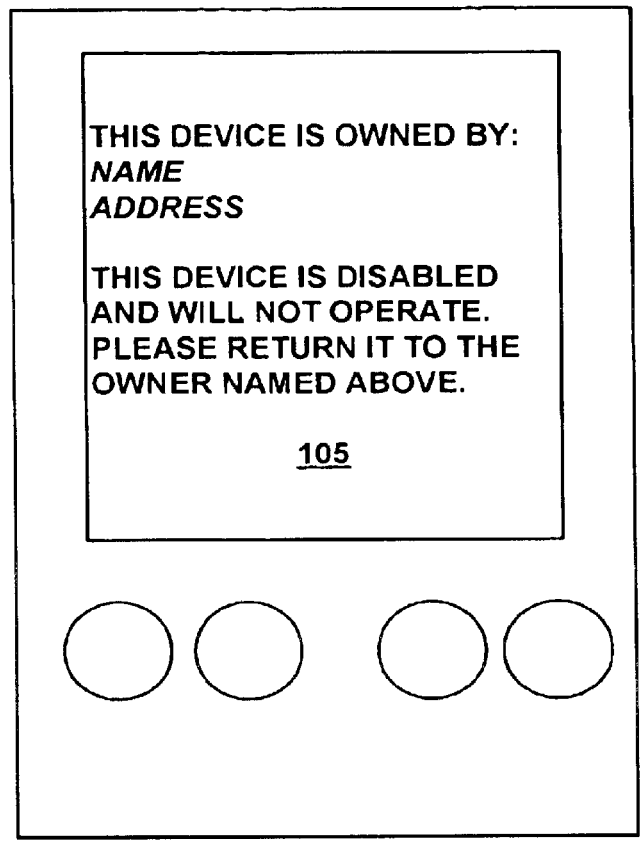
FIG. 10 illustrates an exemplary display of contact information in a portable computer system in accordance with one embodiment of the present invention.

In one embodiment, information for identifying and contacting the authorized owner or user is displayed on display device 105 (FIG. 5) of portable computer system 100 when the device is in the disabled (locked) mode of operation; refer to FIG. 10. In other embodiments, other security measures can be implemented. For example, Web site 40 can initiate a trace in order to identify the location of portable computer system 100 or the phone number being used to connect with the Internet 52.

Once portable computer system 100 is recovered by the authorized user or rightful owner, it can be reset for normal operation. In one embodiment, a bootstrap reset would be required in order to allow the flash memory to be overwritten with the normal configuration information. In another embodiment, as described in conjunction with step 915, the authorized user can change the account information to indicate that the device is no longer lost or stolen. Accordingly, when portable computer system 100 is subsequently synchronized (per FIG. 8) and connected to Web site 40, operation can be enabled. It is appreciated that other actions may need to be performed in order to re-enable operation of the device.

FIG. 10 illustrates an exemplary display of contact information on display device 105 of portable computer system 100 (FIGS. 1A through 1F) in accordance with one embodiment of the present invention. In the present embodiment, the contact information is automatically displayed when portable computer system 100 is in the disabled mode as a result of being identified as lost or stolen. It is appreciated that the type and level of detail of the contact information displayed is input by the authorized user. It is further appreciated that the contact information can specify a central physical location to which portable computer system 100 can be returned, from which the device is forwarded to the authorized user.

In summary, in accordance with the present invention, when a device (e.g., a portable device such as portable computer system 100) is lost or stolen, it can be more readily recovered and, in the meantime, unauthorized use of the device is prevented. Each time the device is connected to the Internet, the device automatically checks a Web site to determine if it is lost or stolen. If the device is reported as lost or stolen, the device will be disabled to prevent normal operation. While in the disabled mode, the device can display contact information for the authorized user, or the Web site can initiate a trace to find the location of the device.

In accordance with the present embodiment of the present invention, these security measures can be automatically implemented in the background without a user knowing they are occurring, and thus they are convenient and user-friendly. In addition, once it is understood that unauthorized use will cause the device to be disabled and thus of little use to an unauthorized user, the likelihood of theft will probably decrease and the likelihood of return to the rightful owner will probably increase.

Thus, the present invention provides a system and method that can discourage theft of a device such as a portable (palmtop) computer system, PDA, laptop or other types of device, and that can encourage return of the device to the rightful owner if it is lost or stolen. The present invention also provides a system and method that can prevent use of the device if it is not in the possession of an authorized user and that can prevent unauthorized access to information stored on the device. In addition, the present invention provides a system and method that is user-friendly and convenient.

The preferred embodiment of the present invention, identifying and locating lost or stolen personal digital assistant devices via a landline- or wireless-connected web server, is thus described. While the present invention has been described in particular embodiments, it should be appreciated that the present invention should not be construed as limited by such embodiments, but rather construed according to the below claims.

What is claimed is:

1. A method for preventing unauthorized use of a device, said method comprising:
   a) receiving registration information for said device, wherein said registration information comprises a unique identity for said device;
   b) receiving a signal upon use of said device, wherein said signal comprises said unique identity;
   c) determining whether said use of said device is authorized based on said registration information and said unique identity; and
   d) sending a signal to said device to enable operation of said device provided said use is authorized, wherein absent said signal at least a portion of said device is disabled.

2. The method as recited in claim 1, wherein said method is implemented using a server computer system communicatively coupled to said device via the World Wide Web.

3. The method as recited in claim 1, wherein said device is a palmtop computer system.

4. The method as recited in claim 1 wherein said step a) comprises:
   receiving an indication that said device is to be disabled when said signal of said step b) is received; and
   indexing said indication using said unique identity for said device.

5. The method as recited in claim 1 wherein said step a) comprises:
   receiving an indication that said device is to be enabled when said signal of said step b) is received; and
   indexing said indication using said unique identity for said device.

6. The method as recited in claim 1 wherein said step c) comprises:
   c1) indexing said registration information using said unique identity; and
   c2) performing a lookup of said registration information using said unique identity.

7. The method as recited in claim 1 further comprising:
   e) initiating a trace to determine a location of said device.

8. In a portable device, a method for preventing unauthorized use of said portable device, said method comprising:
   a) sending a signal to a central device having a database comprising registration information for said portable device, wherein said signal comprises a unique identity for said portable device;
   b) receiving in response an indication of whether use of said portable device is authorized, wherein authorization is determined based on said registration information and said unique identity; and
   c) implementing an operating mode in response to said indication, wherein said step c) comprises:
      c1) enabling operation of said portable device provided said use is authorized; and
      c2) disabling operation of at least a portion of said portable device provided said use is not authorized.

9. The method as recited in claim 8 wherein said portable device is a palmtop computer system.

10. The method as recited in claim 8 wherein said central device is a server computer system communicatively coupled to said portable device via the World Wide Web.

11. The method as recited in claim 8 wherein said step c2) comprises:
    displaying information for identifying and contacting an authorized user.

12. The method as recited in claim 8 wherein said registration information is indexed using said unique identity and wherein said step b) comprises:
    performing a lookup of said registration information in said database using said unique identity.

13. The method as recited in claim 8 wherein further comprising the step of:
    d) disabling operation of said portable device when said signal of said step a) is not sent to said central device before a specified time period expires.

14. A system for preventing unauthorized use of a device, said system comprising:
    a central device having a database comprising registration information for said device; and
    a device communicatively coupled to said central device;
    wherein upon use of said device, said device operable to send to said central device a signal comprising a unique identity for said device;
    wherein said central device is operable to determine whether said use of said device is authorized based on said registration information and said unique identity, and wherein said central device indicates to said device whether said use is authorized; and
    wherein operation of said device is enabled provided said use is authorized and wherein at least a portion of said device is disabled provided said use is not authorized.

15. The system of claim 14 wherein said device is a palmtop computer system.

16. The system of claim 14 wherein said central device is a server computer system communicatively coupled to said device via the World Wide Web.

17. The system of claim 14 wherein said registration information comprises an indication that said device is to be disabled when said signal is received by said central device from said device.

18. The system of claim 14 wherein said registration information comprises an indication that said device is to be enabled when said signal is received by said central device from said device.

19. The system of claim 14 wherein said registration information is indexed using said unique identity.

20. The system of claim 14 wherein said device comprises a display device for displaying information for identifying and contacting an authorized user.

21. The system of claim 14 wherein operation of said device is disabled when said signal is not communicated by said device to said central device before a specified time period expires.

22. The system of claim 14 wherein said central device initiates a trace to determine a location of said device.

* * * * *